United States Patent [19]
Kohmoto

[11] Patent Number: 5,177,639
[45] Date of Patent: Jan. 5, 1993

[54] STOP DEVICE FOR ZOOM LENS

[75] Inventor: Shinsuke Kohmoto, Tokyo, Japan

[73] Assignee: Asahi Kogaku Kogyo Kabushiki Kaisha, Tokyo, Japan

[21] Appl. No.: 655,720

[22] Filed: Feb. 15, 1991

[30] Foreign Application Priority Data

Feb. 15, 1990 [JP] Japan .................................. 2-34717

[51] Int. Cl.⁵ ...................... G02B 15/14; G02B 15/00; G02B 7/10
[52] U.S. Cl. .................................. 359/740; 359/676; 359/691; 359/738; 359/748
[58] Field of Search ...................... 350/255, 429, 450; 354/195.1, 195.11, 195.12, 236, 233, 270; 359/676, 693, 691, 745, 748, 740, 684, 696, 738

[56] References Cited

U.S. PATENT DOCUMENTS

| | | |
|---|---|---|
| 3,610,733 | 10/1971 | Back . |
| 3,906,529 | 9/1975 | Filipovich ............... 354/195.11 |
| 4,159,864 | 7/1979 | Yasukuni et al. ............... 359/740 |
| 4,210,387 | 7/1980 | Ogawa . |
| 4,299,453 | 11/1981 | Momiyama et al. ............ 359/740 X |
| 4,367,927 | 1/1983 | Fujii ............................ 359/740 X |
| 4,417,281 | 11/1983 | Hama ........................... 350/429 X |
| 4,432,615 | 2/1984 | Ikemori ......................... 350/450 X |
| 4,487,482 | 12/1984 | Itoh et al. . |
| 4,506,958 | 3/1985 | Imai .............................. 359/740 X |
| 4,623,266 | 11/1986 | Fujii ............................. 359/740 X |
| 4,630,899 | 12/1986 | Kato et al. .................... 359/740 X |
| 4,749,269 | 6/1988 | Nakashima et al. . |
| 4,759,618 | 7/1988 | Kamata ........................ 350/429 |
| 4,911,542 | 3/1990 | Nishio et al. ................. 350/429 |
| 5,018,843 | 5/1991 | Inadome et al. ............... 350/429 |

FOREIGN PATENT DOCUMENTS

| | | |
|---|---|---|
| 55-55305 | 4/1980 | Japan . |
| 57-13850 | 3/1982 | Japan . |
| 58-62632 | 4/1983 | Japan . |
| 1431463 | 4/1976 | United Kingdom . |

OTHER PUBLICATIONS

English Language Abstract of Japanese Patent Publication 55-55305.
English Language Abstract of Japanese Patent Publication 58-62632.

Primary Examiner—Constantine Hannaher
Assistant Examiner—Edward J. Glick
Attorney, Agent, or Firm—Sandler, Greenblum & Bernstein

[57] ABSTRACT

A stop device for a zoom lens includes an aperture-stop provided between a front lens group and a rear lens group. The front lens group, the rear lens group, and the aperture-stop are moved relative to each other by a motor, to carry out a zooming operation. The motor is provided behind the front lens group and the aperture-stop, and the aperture-stop is positioned closed to a front end of the motor when the aperture-stop is at its rearmost position.

14 Claims, 2 Drawing Sheets

STOP DEVICE FOR ZOOM LENS

BACKGROUND OF THE INVENTION

1. Field of the Invention

The present invention relates to a stop device provided in a zoom lens.

2. Description of the Related Art

Conventionally, an aperture-stop of a zoom lens is provided close to and in front of a rear lens group, and is connected to the rear lens group as a single body, as disclosed, for example, in Japanese Unexamined Patent Publication No. 58-62632. Namely, in a zooming operation, the aperture-stop is moved together with the rear lens group, and the distance between the aperture-stop and the rear lens group is set to as small a gap as possible, to ensure that the aperture-stop does not interfere with a front lens group when moved toward the front lens group.

On the other hand, a known power zoom lens is constructed in such manner that a front lens group and a rear lens group are moved by a motor housed in a rear portion of a lens barrel. In this power zoom lens, however, because the rear lens group can be moved to a position close to a rear end of the lens barrel in a zooming operation, the aperture-stop would interfere with the motor if the aperture-stop was provided immediately in front of the rear lens group.

SUMMARY OF THE INVENTION

Therefore, an object of the present invention is to provide an aperture-stop in a stop device for a zoom lens including a motor which is prevented from interfering with the motor, while maintaining needed space for housing the motor.

According to the present invention, there is provided a stop device comprising an aperture-stop disposed between one lens group and the other lens group, and movable along the optical axis and relative to the other lens group. The aperture-stop is positioned close to a front end of the motor when the aperture-stop is positioned at its rearmost position.

Further, according to the present invention, there is provided a stop device comprising an aperture-stop disposed in front of the other lens group, and movable relative to the other lens group, the aperture-stop being positioned close to a front end of a motor when the aperture-stop is positioned at its rearmost position.

Still further, according to the present invention, there is provided a zoom lens comprising a front lens group, a rear lens group, a motor for moving at least one of the front lens group and the rear lens group along the optical axis, to thereby carry out a zooming operation, and an aperture-stop which is provided between the front lens group and the rear lens group. The motor is provided behind the front lens group, and the aperture-stop is moved by the motor along the optical axis and positioned close to a front end of the motor, when the aperture-stop is positioned at a point farthest from the front lens group.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
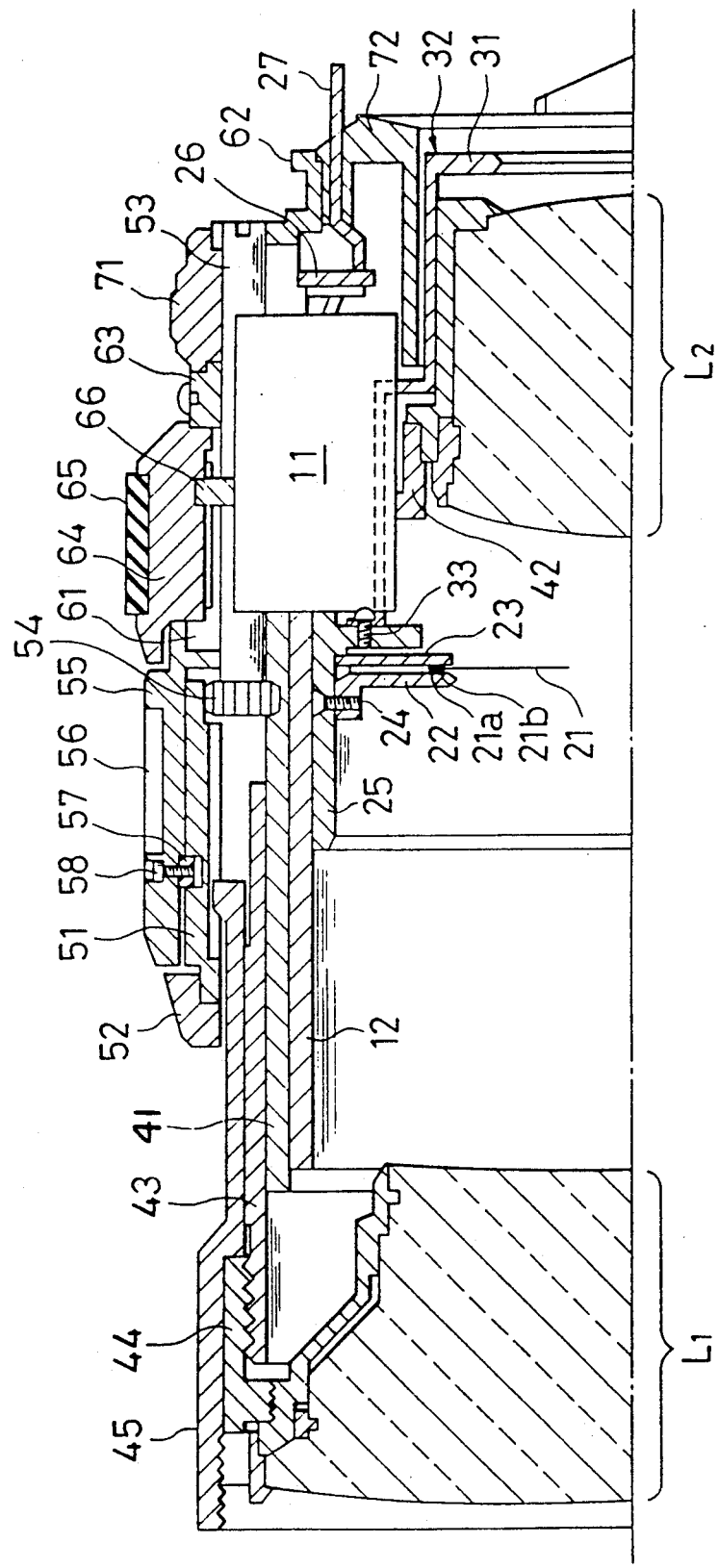
FIG. 1 is a sectional view of a zoom lens in a wide-angle configuration, as one embodiment of the present invention.

The present invention will now be described with reference to embodiments shown in the drawings.

Figure 2:
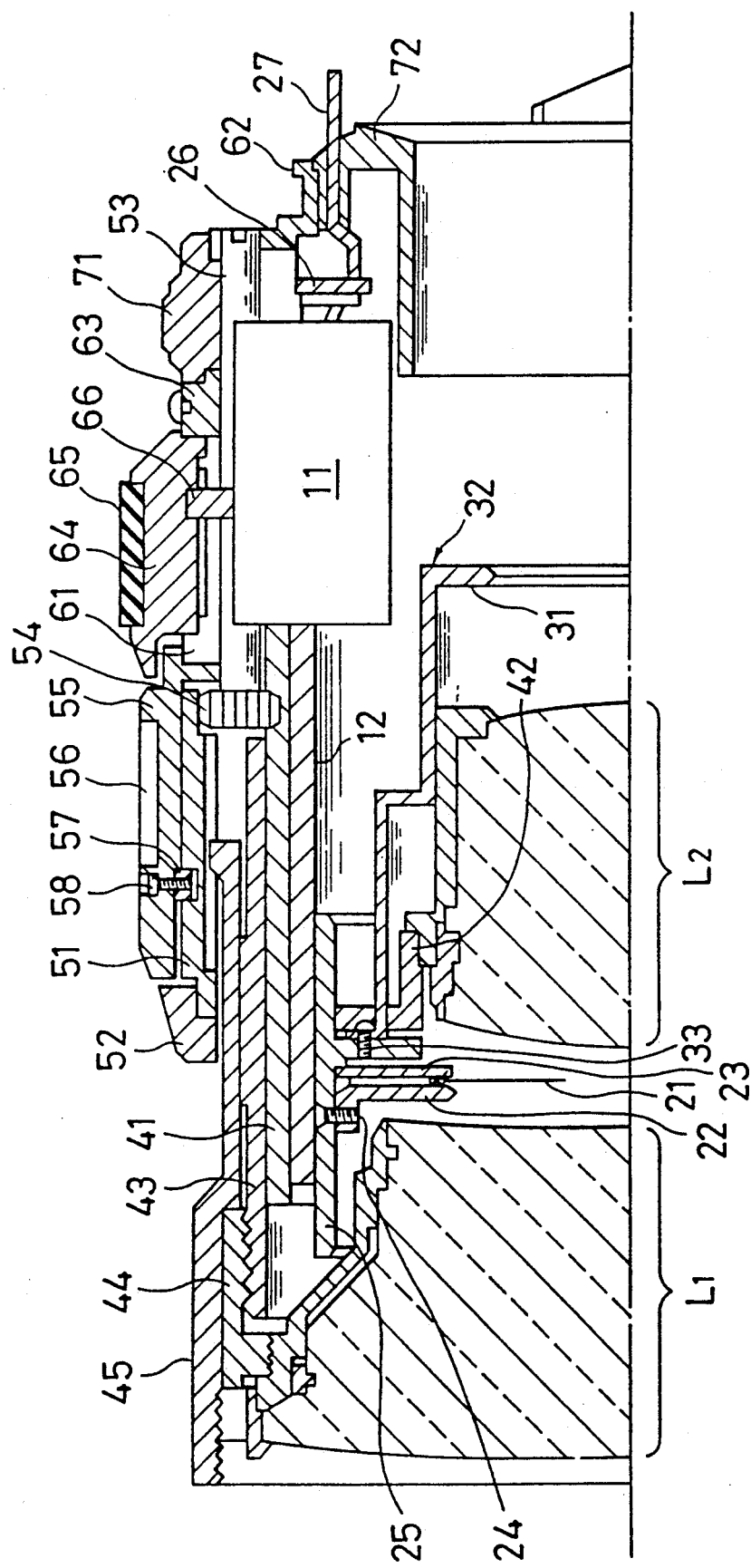
FIG. 2 is a sectional view of the zoom lens in a telephoto configuration.

FIGS. 1 and 2 show an embodiment of the present invention in a wide-angle state and in a telephoto state, respectively. In this embodiment, the present invention is applied to a two lens group type zoom lens having a front lens group L1 and a rear lens group L2. A motor 11 is provided behind the front lens group L1, and behind an aperture-stop described later. As is well known, a cam ring 12 is rotated by the motor 11 so that these lens groups L1 and L2 are moved relative to each other along the optical axis, to thereby carry out a zooming operation. During zooming the rear lens group L2 is moved between a position in front of the motor 11 to a position close to the motor 11.

An aperture-stop is constructed by a plurality of stop blades 21 disposed in front of the rear lens group L2 and between the front lens group L1 and the rear lens group L2. An outer periphery of each stop blade 21 is sandwiched between a support ring 22 and an open-close ring 23. The support ring 22 is fixed to a stop moving ring 25 by a fixing screw 24, and the open-close ring 23 is rotatably supported by the stop moving ring 25. Each stop blade 21 is provided with two projections 21a and 21b, one of which is rotatably supported by the support ring 22 and the other of which is engaged with a groove (not shown) formed in the open-close ring 23. Therefore, when the open-close ring 23 is rotated, each stop blade 21 is rotated relative to the support ring 22, whereby the size of the aperture-stop is changed.

The open-close ring 23 is connected to a stop lever 27 via a connecting member 26 (only a part of member 26 being shown in the drawings). The stop lever 27 is connected to a stop drive mechanism (not shown) provided in a camera body (not shown) and rotated thereby. Namely, the aperture-stop is controlled from the camera body.

A fixed-stop 31 is provided for preventing flare, and is disposed behind the rear lens group L2. The fixed-stop 31 is formed in a fixed-stop ring 32 connected to the stop moving ring 25 through a fixing screw 33. Namely, the fixed-stop 31 is connected to the aperture-stop as a single body, and thus is moved along the optical axis together with the aperture-stop.

The stop moving ring 25 is slidably fitted in the cam ring 12, which is rotatably fitted on a stationary cylinder 41. The cam ring 12 is provided with a cam groove (not shown), and the stationary cylinder 41 is provided with a linear groove (not shown). A pin (not shown) is provided on the stop moving ring 25 and is extended through the cam groove formed in the cam ring 12 so that it engages the linear groove formed in the stationary cylinder 41. Accordingly, when the cam ring 12 is rotated by the motor 11, the stop moving ring 25 is moved along the optical axis in accordance with the shape of the cam groove in which its pin is positioned.

The rear lens group L2 is fixed to a connecting ring 42, and a pin (not shown) provided at the connecting ring 42 is extended through a second differently profiled cam groove for a different portion of the cam groove formed in the cam ring 12, and is engaged with the linear groove formed in the stationary cylinder 41, similar to the engagement of the pin of the stop moving ring 25. Therefore, rotation of the cam ring 12 causes the rear lens group L2 to move along the optical axis in accordance with the shape of the cam groove in which its pin is positioned.

Accordingly, the stop moving ring 25 and the rear lens group L2 are moved along the optical axis, respectively, and the aperture-stop and the fixed-stop 31 are thus moved relative to the rear lens group L2. The rear lens group L2 is located between the aperture-stop and the fixed-stop 31.

A helicoid ring 43 is fitted on an outer surface of the stationary cylinder 41, and is movable relative to the stationary cylinder 41 along the optical axis but cannot rotate about the optical axis. A pin (not shown) provided on the cam ring 12 is engaged with a cam groove (not shown) formed in the helicoid ring 43 through a linear groove formed in the stationary cylinder 41 and extending along the circumference thereof. Therefore, the helicoid ring 43 is moved along the optical axis by rotation of the cam ring 12.

A lens ring 44 is threadingly fitted on a helicoid formed on an outer surface of a front end of the helicoid ring 43, and the front lens group L1 is connected to the lens ring 44 as a single body. In a zooming operation, the lens ring 44 and the helicoid ring 43 are not rotated relative to each other, and therefore, rotation of the cam ring 12 causes the helicoid ring 43 and the front lens group L1 to be moved along the optical axis as a single body.

The lens ring 44 is attached to an inner surface of a cylindrical front frame 45 as a single body. The front frame 45 is extended over an outer surface of the helicoid ring 43, and an engaging portion formed on a rear end portion of the front frame 45 is engaged with a linear groove formed in a rotational ring 51 and extending along the optical axis. Therefore, when the helicoid ring 43 is stationary, if the rotational ring 51 is rotated, the front frame 45 is rotated, and thus the front lens group L1 is moved along the optical axis due to the helicoid formed on the helicoid ring 43, whereby a focus adjustment is carried out.

A focus ring 52 is connected to a front end of the rotational ring 51 as a single body, and is used for a manual focus adjustment. On the other hand, a gear 54 provided on a tip portion of a rotational shaft 53 is meshed with a second gear (not shown) formed on an inner surface of the rotational ring 51. This rotational shaft 53 is connected to an autofocus mechanism (not shown) provided in the camera body. Namely, the gear 54 is rotated by an operation of the autofocus mechanism, whereby the rotational ring 51 is rotated to carry out an autofocus operation.

An indication window 56 is formed in a stationary ring 55, to enable the distance between the camera and an object to be clearly seen. A stopper 57 is attached to the stationary ring 55 by a fixing screw 58, and is engageable with a stopper member (not shown) formed in the rotational ring 51, to restrict rotational displacement of ring 51. This engagement also restricts displacement of the rotational ring 51 along the optical axis.

The stationary ring 55 is connected to a bayonet ring 52 and the stationary cylinder 41 through a connecting ring 61, which is provided with a zoom press ring 63. A zoom ring 64 is provided between the zoom press ring 63 and the stationary ring 55, and a rubber ring 65 is fitted on an outer surface of the zoom ring 64 to facilitate manual operation thereof.

The zoom ring 64 is connected to the cam ring 12 through a transmitting lever 66. Therefore, when the zoom ring 64 is rotated, the cam ring 12 is also rotated, whereby the front lens group L1 and the rear lens group L2 are moved along the optical axis to carry out a zooming operation.

Note that, in an autofocusing adjustment, transmitting lever 66 is disconnected from the zoom ring 64.

A stop scale ring 71 is provided for setting a stop value in a manual operation. A protection ring 72 is provided for protecting the inside of the lens barrel and preventing reflection of light from an inner face of the lens barrel.

In the above embodiment, when the motor 11 is rotated, the cam ring 12 is rotated, and thus the front lens group L1, the rear lens group L2, and the stop moving ring 25 are moved along the optical axis, independently of each other, whereby a zooming operation is carried out and the aperture-stop and the fixed-stop 31 are set to be moved into predetermined positions.

In a wide-angle state, as shown in FIG. 1, the rear lens group L2 and the stop moving ring 25 are positioned at the rearmost position in the lens barrel and close to the motor 11, and the aperture-stop is positioned close to a front end of the motor 11. On the other hand, in a telephoto state, as shown in FIG. 2, the rear lens group L2 and the stop moving ring 25 are moved forward in the lens barrel, and the rear lens group L2 is positioned close to the front lens group L1 and in front of the motor 11, while the aperture-stop is positioned close to both the front lens group L1 and the rear lens group L2.

A position of the fixed-stop 32 at which an optimum flare preventing effect is obtained is changed in accordance with the positional relationship between the front and rear lens groups L1 and L2, and is also changed in accordance with movement of the rear lens group L2. In this embodiment, the fixed-stop 31 and the aperture-stop are connected to each other as a single body, and therefore, this embodiment can be applied to a lens in which the fixed-stop and the aperture-stop are moved in the same direction, to thereby obtain an optimum flare preventing effect.

Further, according to this embodiment, when the rear lens group L2 is positioned at its rearmost position, the aperture-stop is positioned immediately in front of the motor 11 (see FIG. 1) and in front of the rear lens group L2, at a predetermined distance therefrom, and the fixed-stop 31 is positioned immediately behind the rear lens group L2. Therefore, the aperture-stop will not interfere with the motor 11, and thus a space for housing the motor 11 can be retained.

Note that, although the above embodiment is applied to a two lens group type zoom lens, the present invention can be applied to a zoom lens having three or more lens groups, in which case the rear lens group in the present invention means the lens group positioned at the rearmost position.

Although the embodiments of the present invention have been described herein with reference to the accompanying drawings, obviously many modifications and changes may be made by those skilled in this are without departing from the scope of the invention.

We claim:

1. A stop device for a zoom lens having front and rear ends and including at least two lens groups and a motor having at least one end, said lens groups being movable relative to each other along the optical axis by said motor, one of said lens groups being located in front of the other of said lens groups along the optical axis, said stop device comprising:

an aperture-stop disposed between one of said lens groups and said other lens group, and movable along the optical axis between frontmost and rearmost positions, relative to said other lens group, said aperture-stop being positioned adjacent to said one end of said motor when said aperture-stop is at said rearmost position.

2. A stop device according to claim 1, wherein said motor is provided behind said one lens group and said aperture-stop, and said other lens group is moved from a position spaced from said motor to a position adjacent to said motor.

3. A stop device according to claim 1, further comprising a fixed-stop provided behind said other lens group and connected to said aperture-stop as a single body, so as to be movable along the optical axis with said aperture-stop.

4. A stop device according to claim 3, further comprising a stop moving ring and a fixed-stop ring connected to each other, said aperture-stop being provided in said stop moving ring and said fixed-stop being formed in said fixed-stop ring.

5. A stop device according to claim 4, wherein said stop moving ring is moved by said motor.

6. A stop device according to claim 1, wherein said zoom lens further comprises a lens barrel within which said lens groups and said aperture-stop are received, said motor being positioned within said lens barrel.

7. A stop device according to claim 1, wherein said aperture-stop is movable relative to said at least two lens groups.

8. A stop device for a zoom lens having front and rear ends and housing a motor, having at least one end, for moving one lens group which is disposed in front of another lens group, said stop device comprising:

an aperture-stop disposed in front of said other lens group and movable relative to said other lens group between frontmost and rearmost positions, said aperture-stop being positioned adjacent said one end of said motor when said aperture-stop is at said rearmost position.

9. A stop device according to claim 8, wherein said zoom lens further comprises a lens barrel within which said lens groups and said aperture-stop are received, said motor being positioned within said lens barrel.

10. A stop device according to claim 8, wherein said aperture-stop is movable relative to said one lens group and said other lens group.

11. A zoom lens having front and rear ends, and comprising:

a front lens group;

a rear lens group;

a motor having at least one end, for moving at least one of said front lens group and said rear lens group along the optical axis to thereby carry out a zooming operation, said motor being provided behind said front lens group; and an aperture-stop provided between said front lens group and said rear lens group, said-aperture stop being moved by said motor along the optical axis, and positioned adjacent said motor when said aperture-stop is positioned at a point farthest from said front lens group.

12. A zoom lens according to claim 11, further comprising a lens barrel within which said lens groups and said aperture-stop are received, said motor being positioned within said lens barrel.

13. A zoom lens according to claim 11, wherein said aperture-stop is movable relative to said front and rear lens groups.

14. A zoom lens including at least two lens groups within a lens barrel, one of said lens groups being a rear lens group, said zoom lens comprising:

a motor for causing said lens groups to be movable relative to each other along the optical axis within a predetermined range, said motor being located within said lens barrel; and an aperture-stop disposed in front of said rear lens group, said aperture-stop being positioned adjacent to an end of said motor when said aperture-stop is at the rearmost position of said range.

* * * * *